United States Patent [19]
Paakkunainen

[11] Patent Number: 6,065,513
[45] Date of Patent: May 23, 2000

[54] GRAPPLE OF A TREE HARVESTING MACHINE

[75] Inventor: Marko Paakkunainen, Tampere, Finland

[73] Assignee: Plustech Oy, Tampere, Finland

[21] Appl. No.: 09/214,956

[22] PCT Filed: Jul. 17, 1997

[86] PCT No.: PCT/FI97/00449

§ 371 Date: Jan. 15, 1999

§ 102(e) Date: Jan. 15, 1999

[87] PCT Pub. No.: WO98/03055

PCT Pub. Date: Jan. 29, 1998

[30] Foreign Application Priority Data

Jul. 17, 1996 [FI] Finland ..................... 962874

[51] Int. Cl.[7] ............................................. A01G 23/095
[52] U.S. Cl. ................ 144/24.13; 144/247; 144/343
[58] Field of Search ................ 144/24.13, 4.1, 144/246.1, 247, 248.6, 335, 341, 343, 208.8

[56] References Cited

U.S. PATENT DOCUMENTS

| | | | |
|---|---|---|---|
| 3,724,518 | 4/1973 | Zehavi et al. | 144/247 |
| 4,194,542 | 3/1980 | Eriksson | 144/24.13 |
| 4,515,192 | 5/1985 | Eriksson | 144/24.13 |
| 4,662,413 | 5/1987 | Bater | 144/247 |
| 5,186,227 | 2/1993 | Eriksson . | |

FOREIGN PATENT DOCUMENTS 469774  9/1993  Sweden .

*Primary Examiner*—W. Donald Bray
*Attorney, Agent, or Firm*—Quarles & Brady LLP

[57] ABSTRACT

In the grapple of a tree harvesting machine, the feeding means (14, 15) and/or delimbing means (1, 2) are pairwise coupled in a way that the movement of the actuator (6) is transmitted to one swinging arm (5) of the pair directly and to the other one by means of a drive arm (7) and a torsion spring (18).

8 Claims, 4 Drawing Sheets

GRAPPLE OF A TREE HARVESTING MACHINE

The present invention relates to the grapple structure of a tree harvesting machine, harvester, to be driven on a terrain, the grapple being used for felling, delimbing and cutting the tree, and particularly for gripping the trunk of the tree.

Trees to be felled, delimbed and cut vary to a great extent in their diameters, knottiness and body shape, and the diameter of a single trunk can be about half a meter in the lower part of the stem and only 5 cm at the crown end. The machine part, grapple, which is capable of felling and delimbing, should be relatively massive, wherein it can also easily damage the tree to be felled. This applies also to those means of the grapple which are used for delimbing. Further, high demands are set on the delimbing means by the variety of knots, their thickness, shape of butt, and number. Moreover, the delimbing blades should follow precisely the variations in thickness of the trunk.

This invention presents a method for evening out the clamping force of the tree feeding means and the delimbing means against the trunk and for providing said means with a degree of flexibility at quick changes in trunk diameter. This results in obvious advantages in the use as well as the design of the means.

The grapple of the harvester, fixed to the crane part of a terrain vehicle, is composed of tree feeding means, such as rollers, fixed to the grapple support structure, as well as of tree delimbing means, the delimbing blades. The grapple includes also a tree cross-cutting device, the means related to measuring the tree, as well as the driving and actuating apparatus of the said means, which are usually hydraulic motors or cylinders with the related control devices. The equipment related to positioning the grapple for tree felling, delimbing and manipulation will not be discussed in this specification.

The grapple of the harvester has two operating positions when used in a forest. For felling the tree, the grapple is in a vertical position, wherein the grapple grips the trunk primarily with the feeding means. These means can be rollers, chain track constructions wound around two rollers, or the like. Also the delimbing means can be helpful when fixing the grapple to the trunk. The clamping motion of both against the trunk is usually achieved with hydraulic cylinders. The feeding movement of the feeding means is usually achieved with hydraulic motors.

For delimbing the trunk and cutting it to lengths, the feeding means feed the trunk forward starting from its bottom and the movement is continued towards the crown. The grapple is stopped when a trunk part of a certain length has been measured, and the trunk is cut by the cutting means placed in the grapple. This is continued until the trunk is cut into suitable pieces. In the same connection, when the trunk moves through a circle formed by the delimbing blades fixed in the grapple, the blades cut the knots off the trunk. The trunk transfer movement is very fast, and thus both the feeding means and the delimbing means must give way to the trunk passed between them according to the changes in the diameter and roughness of the trunk.

Particularly when the tree feeding rate, i.e. the rate at which the trunk is moved by the feeding means, is high, the problem arises how to achieve sufficiently fast pressure control of the hydraulics in the hydraulic cylinders generating the compression in order to avoid extra loads on the transport means and the delimbing means. This is achieved by using pressure control valves with high flow-through capacity and precise control properties as well as pipe systems with a larger diameter. Also the rollers of the feeding means must be equipped with a thicker elastic layer of (for example) rubber.

Swedish Published Specification No. 467 102 discloses a basic grapple solution having track chains as the feeding means, their clamping movement as well as the delimbing means of the same apparatus and their blades being controlled by hydraulic cylinders. The track chains of the feeding means are equipped with rubber elements which dampen the loads caused by the roughness of the trunk, as well as the movements of the roller system. Except for the hydraulics, the delimbing means are not provided with any dampening elements or means.

Swedish Published Specification No. 469 774 discloses a grapple structure having at least two rollers as the feeding means, as well as delimbing blades on their both sides, and further a separate blade for delimbing the upper part of the trunk which is capable of springing up to a certain angle according to the dimensions of the trunk by means of a cup spring construction. Seen in the direction of delimbing, the clamping movement of the rear pair of delimbing blades directed towards the trunk is transmitted to the front delimbing blades by means of a torsion spring, whereas the clamping movement of the rear delimbing blades is made resilient only within limits allowed by the hydraulic cylinder. The corresponding clamping movement of the rollers of the feeding means is achieved by hydraulic cylinders, wherein abrupt changes in the thickness of the trunk are received only by the elasticity allowed by its control circuit as well as the elastic (rubber) surface layer of the rollers.

The purpose of the present invention is to provide both the feeding means and the delimbing means with a possibility of resiliency so that it takes place mechanically, independently of the hydraulics, always when there is a need for springiness. At the same time, a sufficiently strong clamping grip is achieved between the feeding means or delimbing means and the trunk.

The invention is characterized in what will be presented in the characterizing part of the appended claim 1. A normal swinging arm of the clamping means is, in a way, divided into two components: a drive arm, moved by the actuator, and a swinging arm, and these are arranged to pivot in relation to each other around a rotation axis determined by the same axle journal.

The invention is based on the fact that the drive arm, which transmits the movement from the actuator (often a hydraulic cylinder) driving each operation to the swinging arm, is fixed on the axle of the pivoting movement of the feeding means or delimbing blade, or on a separate axle aside of it, by means of a torsion spring. In the construction made according to the invention, it is easy to make all the means clamping against the trunk to be pairwise sufficiently resilient, wherein they conform advantageously to the unevenness of the trunk.

The invention can also be expanded in a way that more than one pair of feeding or delimbing means can be connected to the same actuator.

The advantages of the invention are obvious. Because the means used in both feeding and delimbing of the trunk spring immediately according to the roughness of the trunk because of their mechanical construction, the hydraulics can be arranged by using normal components whose flow-through capacity and operating rate do not need to be extraordinary. Further, quick reaction of the feeding means and the delimbing means to the unevenness of the trunk will prevent transmission of abrupt and major changes in the load to the construction, and this can be taken into account when constructing an advantageous construction. Because the clamping movement of the feeding means, rollers or the like, can be transmitted in the same way by means of resilient torsion springs, the rubber surfaces used on the rollers for dampening, or rubber bands wound around the set of rollers can be made thinner, which makes the manufacture of the feeding means less expensive. Moreover, their structure becomes lighter.

The elastic element of the torsion spring can under certain overload deform itself in the direction of the surfaces moving with the movements of the swinging arm and the drive arm, wherein the mutual position of the surfaces in this direction is capable of changing. The circular movement of these surfaces is concentric around the rotation axis between the swinging arm and the drive arm, and the elastic element is placed between the surfaces. In a normal situation, the elastic element remains intact between the surfaces, and the mutual position between the surfaces is not changed in the direction of the circular movement.

In the following, the invention will be described more closely with reference to the appended drawings. For clarity and for simplification, the figures do not show those means of the grapple which are not directly related to the invention. There will be several different modifications of the construction according to the invention.

Figure 1:
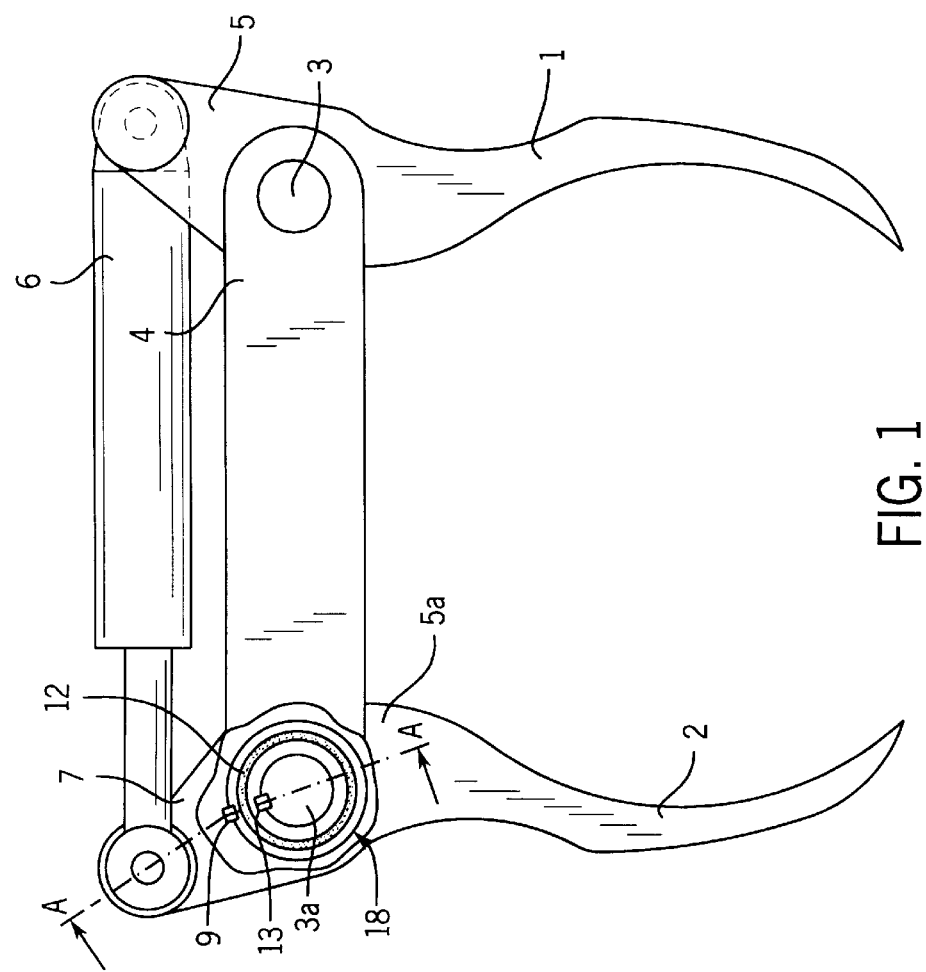
FIG. 1 shows an embodiment of the delimbing means in the grapple of the harvester seen in the direction of the trunk.

FIG. 1 shows a basic form of the invention. Here a pair of delimbing blades 1, 2 is pivotally connected via axles 3, 3a to the grapple frame 4 which is only schematically shown in the figure. To a lever-like extension on the opposite side of the axle of the delimbing blade 1, namely to the swinging arm 5, is pivotally connected an actuator 6, which in the case shown in the figure is a hydraulic cylinder. The cylinder part is pivotally connected to the extension 5 of the first blade 1 in the pair and the piston part is pivotally connected to the drive arm 7, which in turn is coupled by means of a torsion spring 18—to be described in more detail with reference to FIG. 2—to the swinging arm 5a of the second delimbing blade 2. The actuator 6 generates the movement of the blades 1 and 2 in the pair of delimbing blades by clamping the blades around the trunk which is situated in the space between them. Because the drive arm 7 is in connection with the second blade 2 via the torsion spring 18, the blades have, depending on the stiffness of the torsion spring, a possibility to spring when the trunk is passed between the blades, if there is unevenness in the diameter of the trunk.

Figure 2:
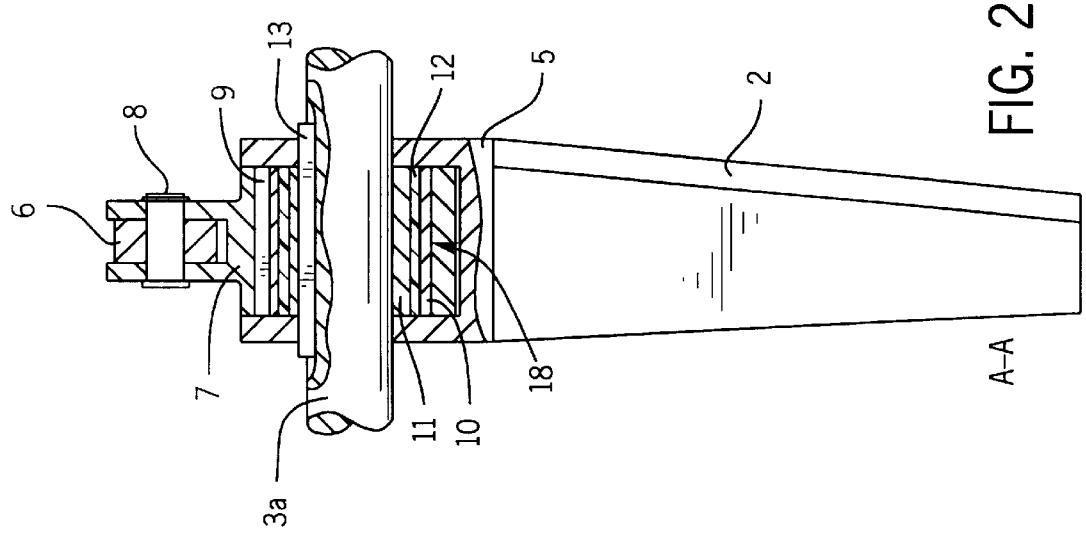
FIG. 2 shows the section (A—A) denoted in FIG. 1.

FIG. 2 shows a section A—A indicated in the FIG. 1. The figure does not show the grapple frame part 4 at which the axle 3 is mounted to rotate in relation to the frame. The drive arm 7 and the swinging arm 5a are at the same location in the longitudinal direction of the axle 3a and inside one another so that the drive arm 7 is placed between the lugs of the swinging arm 5a. The movement transmitted by the actuator 6 is transferred via a journal 8 to the drive arm 7, whose movement is transmitted forward through a key 9 to the torsion spring 18 formed by two bushes 10 and 11 inside one another and by a bush-like part 12 in the space between these bushes which is made of an elastic material and fixed in an anti-slip manner to both the bush 10 and the bush 11. From the inner bush 11, the movement is transmitted by means of a key 13 to the axle 3a as well as to the delimbing blade 2, more precisely to its swinging arm 5a, the blade 2 being its extension. If there is considerable unevenness in the trunk moving between the blades 1 and 2, the distance between the blades 1 and 2 is flexible to some extent, thanks to the effect of the torsion spring, even though the actuator 6 would not yield at all.

Figure 3:
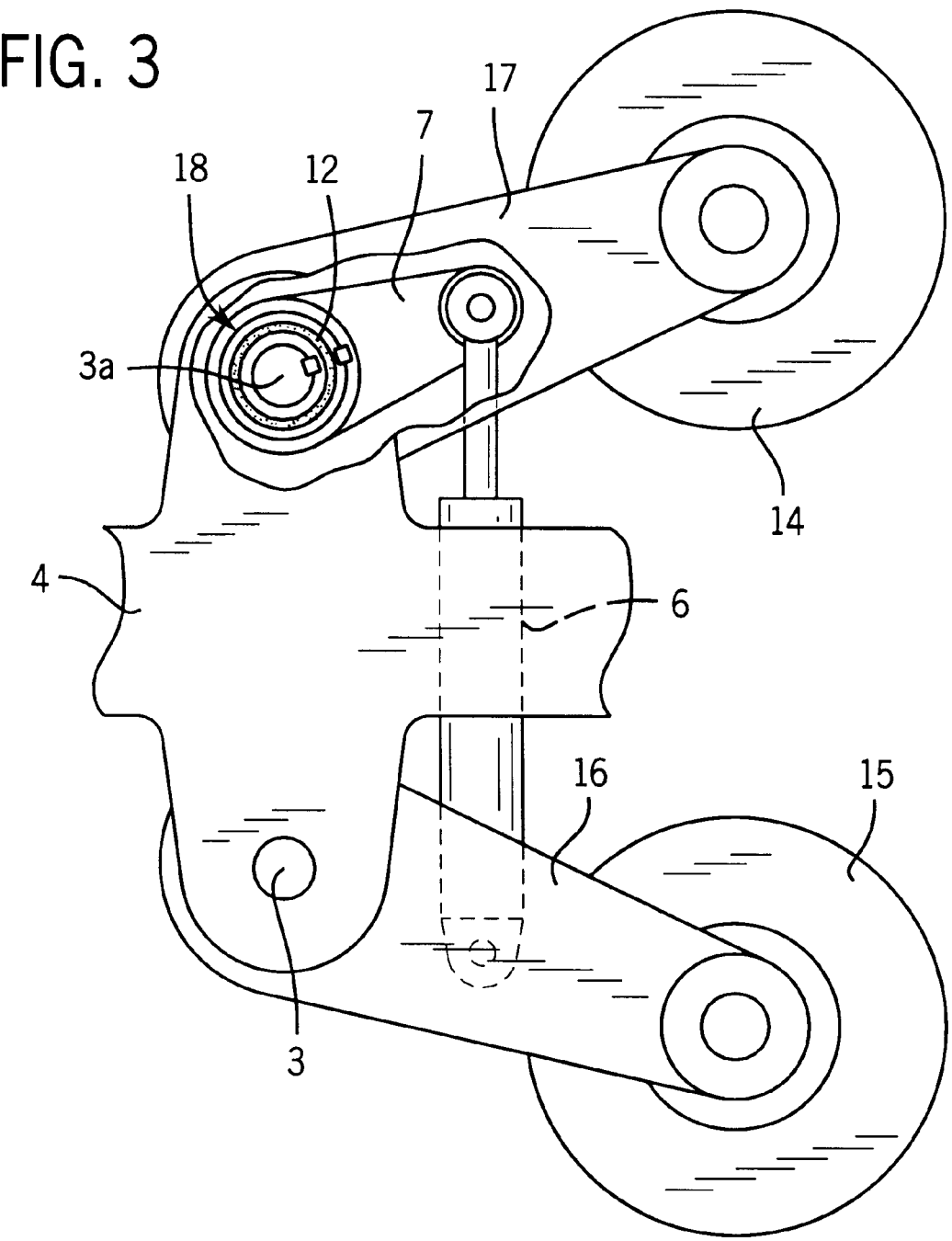
FIG. 3 shows a means which is included in the grapple of the harvester, for feeding the trunk using feeding rollers.

FIG. 3 shows the corresponding embodiment when the torsion spring 18 is used in connection with the feeding means. FIG. 3 shows a case in which the feeding means consist of rollers 14 and 15. The swinging arm 16 of one roller 15 is mounted pivotally on the frame 4 by means of the axle 3. The swinging arm 17 of the other roller 14 is, in the same way as shown in FIGS. 1 and 2, coupled to the drive arm 7 by means of the torsion spring. The actuator 6 moves directly the swinging arm 16 of the second roller 15 and through the drive arm 7 the swinging arm 17 by means of the torsion spring. Irrespective of the actuator 6, the distance between the rollers is flexible, thanks to the torsion spring 18. As shown in FIG. 3, the drive arm 7 can be extended in the same direction as the swinging arm 17 and be placed inside the same.

Figure 4:
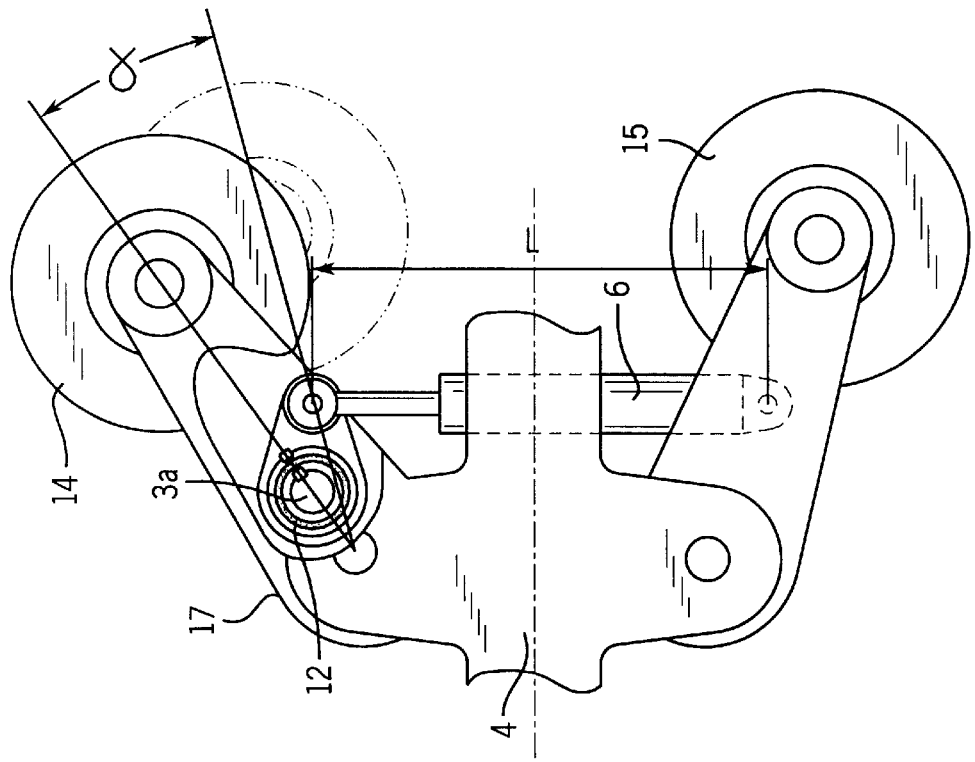
FIG. 4 shows a solution of articulation as an alternative to that shown in FIG. 3.
Figure 4:
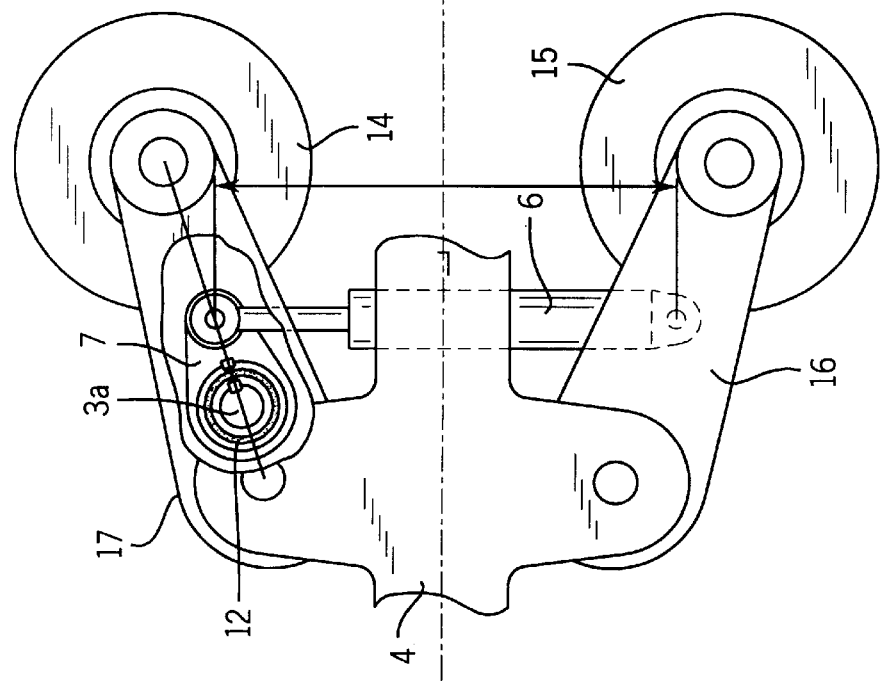

FIG. 4 shows the feeding means 14 and 15 of FIG. 3, the drive arm 7 being coupled to the swinging arm of one feeding means also by the torsion spring, but the rotation axle of the torsion spring is in the arm aside from the actual rotation axle between the arm and the frame 4. The principle of operation and the structure of the torsion spring can be the same as presented above. On the right-hand side of FIG. 4, the swinging arm 17 has sprung by an angle $\alpha_1$ thanks to the torsion spring.

Figure 5:
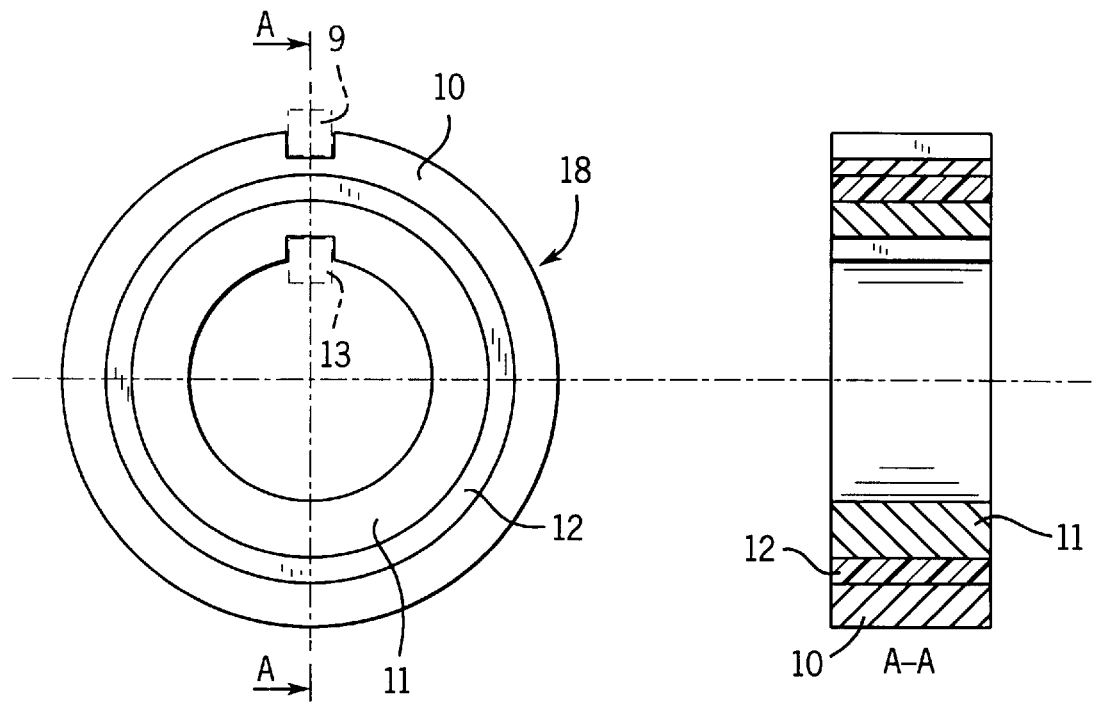
FIG. 5 shows a torsion spring as a reduced representation in a cross-section perpendicular to its rotation axis and in a cross-section taken in the direction of the rotation axis.

FIG. 5 shows the torsion spring 18 as a reduced view. The space 12 between concentric bushes 10 and 11 is filled with an elastic material, such as rubber or the like. This material is fixed in an anti-slip manner onto the inner surface of the bush 10 and onto the outer surface of the bush 11. Keys 9 and 13 (shown by broken lines) are used for transmitting the movement to the torsion spring and further. The torsion spring can be naturally implemented also in another way with respect to the transmission of the movement; for example, the bush 11 and the axle 3a can be fixed to each other in another way or they can be integrated in one piece, and the movement is transmitted forward by means of the design of the axle instead of the key 13.

Figure 6:
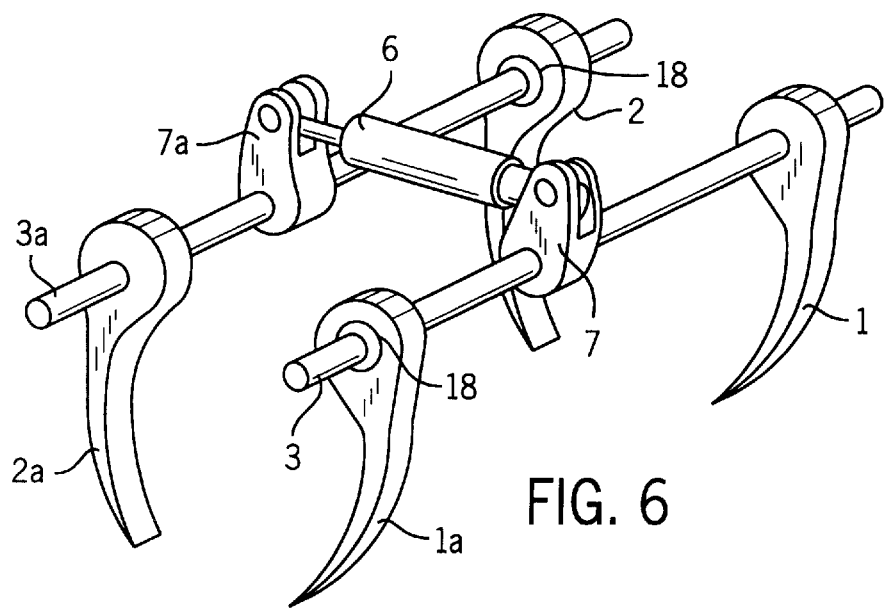
FIG. 6 shows an embodiment in which the construction according to the invention is used for transmission of the clamping movement of more than one delimbing means.

The construction shown in FIG. 6 is an example of applying the invention in a case when more than one pair of delimbing blades or feeding means are connected to operate by means of one single actuator. In FIG. 6, the blades of the pairs 1, 1a and 2, 2a of delimbing blades on the same side are each arranged on a common axle 3 and 3a, respectively, mounted pivotally on the frame (not shown in FIG. 6). The axles 3 and 3a are also provided with drive arms 7 and 7a of the actuator 6 fixed in an anti-slip manner, for example by a key joint. The delimbing blades are fixed on the axles in a way that the blades 1 and 2a in diagonally opposite corners are fixed on the axles 3 and 3a in an anti-slip manner, such as by a key joint, and the blades 1a and 2 are fixed on the axles by means of the torsion spring 18 described above. This kind of a structure gives the pairs of blades the same advantages as in the solution of FIG. 1. It is obvious that the actuator 6 with its arm can be placed freely at any point on the axles, because the element moving with the movement of the drive arm 7 is placed around the long axle rod 3, 3a inside the torsion spring 18. It is also obvious for an expert that the same construction can also be used in connection with the feeding means, if the grapple is provided with two pairs of feeding means, or in a case that the delimbing blades and the feeding means are coupled together mechanically.

The constructions shown in the figures are examples on applying the invention. Both the feeding means and the delimbing means can be made pairwise flexible in the way described above. The invention does not limit any ways of arranging said means in the frame of the grapple nor the points at which said elements with their shafts are to be placed. Also the arm constructions can be modified in each case.

For fixing the elastic material to the bushes, for example vulcanization or glueing can be used, or the fixing surfaces can be such that the elastic material cannot move along the surface of the bush. For example, the surfaces lying against each other can be toothed. It is obvious as such that the hardness or elasticity of the material of the torsion spring has an effect on the torsion angle caused in the torsion spring by the torsion force, which in this connection means springiness. Also the thickness of the material layer has an effect so that the thicker the material layer, the greater the springiness or elasticity. By these two factors, the spring properties can be controlled in the desired way.

It is also obvious for an expert that depending on the use, the elastic material of the torsion spring can vary both in quality and hardness. Further, the material thickness in the torsion spring can vary, and this can be used for influencing the amplitude of the torsion. All these factors can be utilized for finding the optimum springiness for each purpose. For example in connection with the feeding means, the torsion spring can be stiffer than in corresponding use with the delimbing blades.

This invention is not limited to the solution shown in FIG. 5. The elastic element of the torsion spring can be also made of another material than an elastic material having a solid mass, such as rubber. For example, the elastic element can be formed of a stiff spiral spring made of steel and placed between the bushes 10 and 11 in a way that one end of the spring is anchored in the bush 10 and the other end in the bush 11.

The clamping force generated by the actuators of the feeding and delimbing means against the trunk can be controlled for example in a case that the actuator is a hydraulic cylinder, by limiting the pressure of the hydraulic fluid supplied to the hydraulic actuator with suitable pressure reducing means. It is also possible to adjust the clamping force so that the torsion springs have a certain preliminary torsion which is part of the total torsion of the torsion spring. Thus, the torsion spring can be resilient in both directions.

Further, it is possible to arrange a torsion spring at both means of the pair moved by the same actuator 6, but it is sufficient to provide a torsion spring only around one axle, which makes the construction more simple.

What is claimed is:

1. A grapple of a tree harvesting machine, comprising:

a frame;

at least one pair of clamping arms mounted to said frame for clamping a tree trunk;

an actuator for operating said clamping arms;

a drive arm driven by said actuator;

a torsion spring having an elastic element in contact with concentric surfaces, at least one of said surfaces moving with said drive arm and another of said surfaces moving with one of said clamping arms;

wherein said torsion spring transmits motion of said drive arm to said one clamping arm so that said clamping arms move resiliently in relation to one another.

2. A grapple according to claim 1, wherein said concentric surfaces are coaxial with a pivot axis about which said one of said clamping arms pivots relative to said frame.

3. A grapple according to claim 1, wherein said concentric surfaces are offset from a pivot axis about which said one of said clamping arms pivots relative to said frame.

4. A grapple according to claim 1, wherein the elastic element of the torsion spring is between an outer surface and an inner surface surrounding said outer surface.

5. A grapple according to claim 4, wherein the drive arm is fixed to said inner surface and said one of said clamping arms is fixed to said outer surface.

6. A grapple according to claim 1, wherein the drive arm is directly, in a rigid manner, fixed to an axle and movement is transmitted from the axle to said one clamping arm by means of the torsion spring.

7. A grapple according to claim 6, wherein at least two pairs of clamping arms are provided on common axles, at least one of said drive arms is rigidly fixed on each axle, and in each pair of clamping arms at least one of the clamping arms is fixed on one of said axles by at least one of said torsion springs.

8. A grapple according to claim 7, wherein said clamping arms which are fixed by said torsion springs to said axles are diagonally opposite from one another.

\* \* \* \* \*